June 26, 1956 W. A. REX 2,752,291
FLUID HYDROFORMING
Filed June 2, 1952
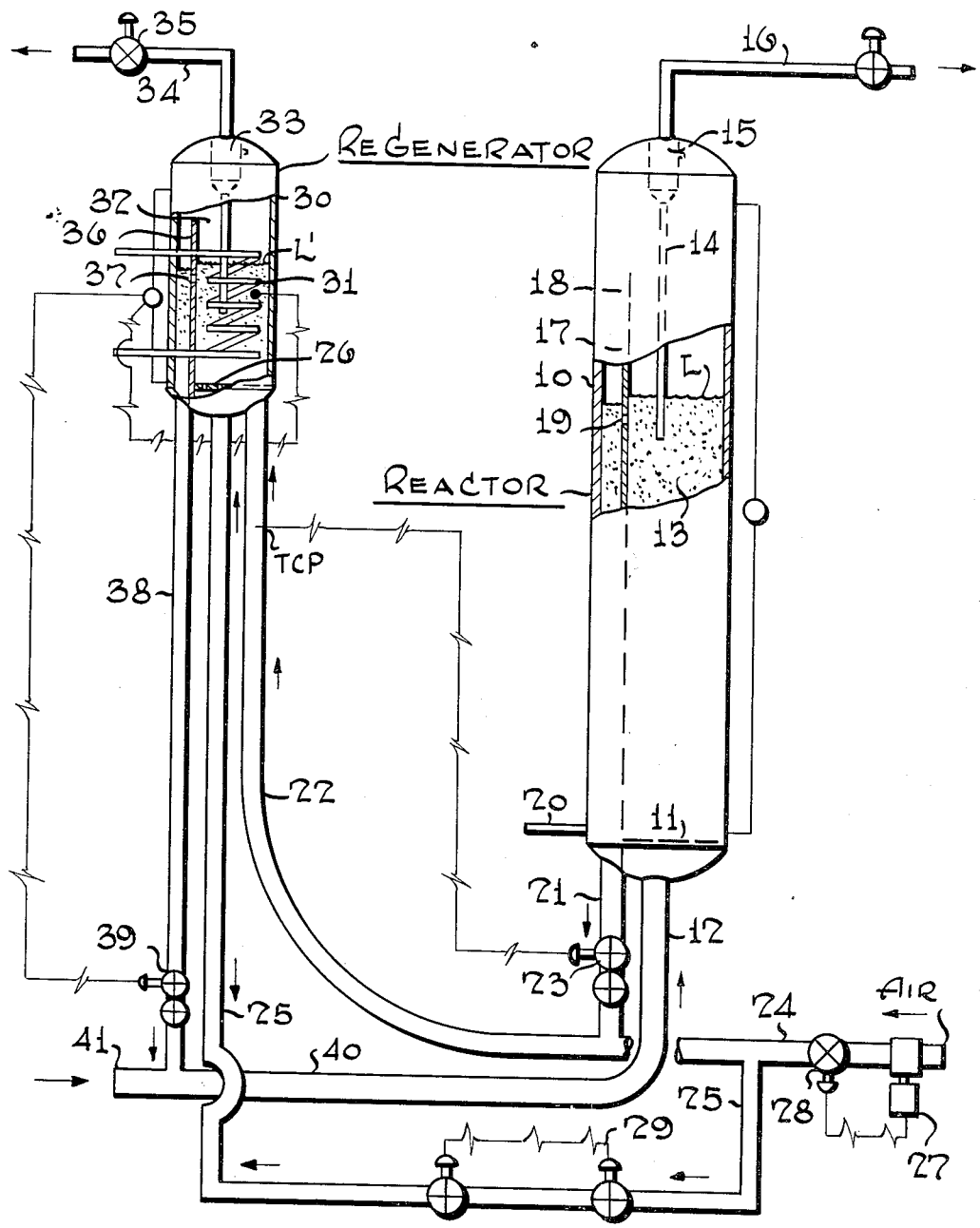
Walter A. Rex Inventor
By H. M. Feyrer Attorney United States Patent Office 2,752,291
Patented June 26, 1956

2,752,291

FLUID HYDROFORMING

Walter A. Rex, Westfield, N. J., assignor to Esso Research and Engineering Company, a corporation of Delaware Application June 2, 1952, Serial No. 291,150

1 Claim. (Cl. 196—50)

The present invention relates to the catalytic conversion of hydrocarbons and particularly to the reforming of hydrocarbon fractions boiling within the motor fuel range of low knock rating into high octane number fuels rich in aromatics by contacting these fractions under reforming conditions with solid catalyst particles in a fluidized solids reactor system.

It is well known that hydrocarbon fractions can be subjected to reforming operations to yield products rich in aromatics or liquid products boiling within the motor fuel range and possessing improved octane numbers and excellent engine cleanliness characteristics. Reforming operations employing catalysts, especially hydroforming and aromatization processes are widely used in the petroleum industry. By hydroforming is ordinarily meant a process wherein hydrocarbon fractions boiling within the motor fuel or naphtha range are treated at elevated temperatures and pressures in the presence of certain solid catalysts and hydrogen whereby the hydrocarbon fraction is increased in aromaticity with no net consumption of hydrogen. The term "aromatization" when used broadly refers to conversions which increase the aromaticity of the hydrocarbon fraction treated. As generally used in the petroleum industry, aromatization is a process in which hydrocarbon fractions are treated at elevated temperatures in the presence of solid catalysts and in the presence or absence of added hydrogen, usually at pressures somewhat lower than those employed in hydroforming whereby the aromaticity of the hydrocarbon fraction is increased.

Catalytic reforming processes are usually carried out at temperatures of about 750°–1150° F. in the pressure range of about 0–300 lbs. per sq. inch and in the presence of such catalysts as molybdenum oxide, chromium oxide, tungsten oxide and in general oxides and sulfides of metals of groups IV, V, VI, VII and VIII of the periodic system of elements. These catalytic materials are usually dispersed or supported on a base or spacing agent. A commonly used spacing agent for this type of catalyst is alumina either precipitated or of the gel type. Catalysts which are more heat stable or better able to withstand the high regeneration temperatures of 1000°–1200° F. encountered in these processes have been prepared upon zinc aluminate spinel supports.

It has been proposed in application Serial No. 188,236, filed October 3, 1950, now U. S. Patent No. 2,689,823, to effect the hydroforming of naphtha fractions in a fluidized solids reactor system in which naphtha vapors are passed continuously through a dense, fluidized bed of reforming catalyst particles in a reaction zone, spent catalyst particles being withdrawn from the dense bed in the reaction zone and transferred to a separate regeneration zone where inactivating carbonaceous deposits are removed by combustion whereupon the regenerated catalysts particles are recycled or returned to the main reactor vessel. Fluid reforming as thus conducted has several fundamental advantages over fixed bed reforming such as (1) the operations are continuous, (2) the vessels and equipment can be designed for single rather than dual functions, (3) the reactor temperature is substantially constant throughout the reactor bed, (4) the regeneration or reconditioning of the catalyst may be readily controlled, and (5) the amount of carbon formed upon the catalyst in the reactor zone, in general, the proper operation of the hydroforming depends upon accurate control of catalyst circulation between the reactor and regeneration zones.

It is the object of this invention to provide a novel method of controlling the circulation of catalyst in a fluidized solids reforming reactor system in which the catalyst is circulated continuously between reaction and regeneration zones.

It is a further object of this invention to provide a novel method of controlling the circulation of catalyst in a fluidized solids hydroforming reactor system which is highly sensitive.

These and other objects will appear more clearly from the detailed specification and claims which follow.

It has now been found that the circulation of catalyst in a fluidized solids hydroforming reaction system can be readily controlled and with considerable sensitivity by providing a temperature responsive controller in the spent catalyst riser to the regenerator which controller actuates the slide valve in the spent catalyst standpipe or the withdrawal line from the reactor. In fluid hydroforming reactor systems of the type with which this invention is concerned, it is essential to use only a part of the total air required for regeneration to convey the spent catalyst through the transfer line and spent catalyst riser into the regenerator. The remaining portion of the air required for regeneration is supplied directly to the regenerator and the air flow to the spent catalyst riser are both fixed by flow control. This air flow to the spent catalyst riser is predetermined and fixed so that a temperature approaching the regenerator temperature is obtained in the riser line at the desired circulation rate from combustion of hydrogen and/or carbonaceous deposits upon the spent catalyst. When the reactor system is in operation, the temperature at the selected point in the spent catalyst riser line will be quite sensitive to changes in catalyst flow because the constant heat release in the riser will cause the stream temperature to rise or fall depending upon the amount of catalyst circulated. Since the hydroforming catalyst also catalyzes the combustion of carbon and since there will always be an excess of carbon on the catalyst, the oxygen in the air supplied to the riser will be completely consumed and the temperature in the riser will be a direct measure of catalyst circulation rate.

Reference is made to the accompanying drawing illustrating one embodiment of the present invention.

In the drawing, 10 is a reactor vessel which may desirably be a vertical cylindrical vessel of considerable length or height. A perforated plate or distributor grid 11 is preferably arranged in the lower part of reactor 10 in order to insure uniform distribution of the incoming reactants over the entire cross-section of the reactor. An inlet line 12 for the introduction of preheated or vaporized feed stock and preheated recycle gas is connected to the bottom of the reactor vessel 10. Since the hydrocarbon feed stock and the recycle gas are preheated separately and to different temperatures, separate inlet lines for these materials can be provided and, if desired, the hydrocarbon feed can be introduced above the grid member 11 in which case a distributor ring or the like would be provided in order to insure uniform distribution of the incoming feed. The reactor is charged with a reforming catalyst such as molybdenum oxide or chromium oxide on a support such as alumina or zinc aluminate spinel. The catalyst being in finely divided form is maintained as a dense, fluidized, turbulent bed 13 by the passage of hydrogen-rich gas and vaporized hydrocarbon feed stock therethrough. The dense bed 13 has a definite level L and is superposed by a dilute or disperse phase 14 comprising gaseous or vaporous reaction products containing a small amount of catalyst entrained therein. The reaction products are taken overhead from the reactor vessel 10, preferably after passage through a cyclone separator 15 which serves to knock out entrained catalyst which is thereupon returned to the dense bed 13 through the dip pipe attached to the bottom of the cyclone separator 15. The reaction products pass overhead through outlet line 16 to suitable fractionating, stabilizing and/or storage equipment.

Means are provided for the withdrawal of a stream of catalyst directly from the dense bed 13. This may be in the form of a cell or conduit 17 arranged within the reactor with its upper end 18 extending above the dense bed level L. One or more ports or restricted passageways 19 are provided in the wall of conduit 17 below the level L of the dense bed for the discharge of catalyst directly from dense bed 13 into conduit 17. The conduit 17 could also be arranged externally of the reactor vessel 10 in which event suitable connector pipes would be provided to conduct a stream of catalyst from the dense bed 13 into the conduit and to conduct stripping gas from the top of the conduit into the dilute phase 14 in the upper part of the reactor, or, if desired, directly into outlet line 16. A gas such as steam, methane, nitrogen, or the like is supplied to the lower portion of conduit 17 as at 20 in order to strip out entrained reaction products or vaporizable materials by passing upwardly through conduit 17 countercurrent to descending catalyst particles. Baffles may be arranged in conduit 17 in order to improve the contact of the catalyst and the stripping gas. Steam is the preferred stripping agent because of its ability to remove chemisorbed hydrogen from the spent catalyst thereby minimizing the amount of combustible material carried by the spent catalyst to the regenerator.

The bottom of the stripping cell or conduit 17 is connected to line 21 and forms therewith a standpipe for discharging stripped spent catalyst into transfer line 22 through which the spent catalyst is conveyed to the regenerator vessel 30. A slide valve 23 or the like is provided in standpipe 21 for controlling the flow of spent catalyst from the reactor 10 into transfer line 22. An inlet line 24 is provided for the supply of air to convey spent catalyst through the transfer line 22 into the regenerator 30. In view of the high rate of burning of the carbonaceous deposits on the reforming catalyst it is preferable to use only a part, generally not more than 15 to 40% of the air required for regeneration as lift gas in transfer line 22 and to supply the major part of the air required for regeneration directly to the regenerator through line 25. A perforated plate or distributor grid 26 is preferably arranged in the lower part of the regenerator to insure uniform distribution of the incoming air over the entire cross section of the regenerator vessel. The velocity of the regeneration gases through the regenerator vessel 30 is so controlled as to form a dense, fluidized turbulent bed 31 of catalyst particles and gas having a definite level L' superposed by a dilute or disperse phase 32 comprising regeneration gases containing small amounts of catalyst entrained therein. The regeneration gases are taken overhead from the regenerator 30 through a cyclone separator 33 or the like which removes entrained catalyst particles from the outgoing gases and returns the separated catalyst to the dense bed 31 through the dip leg attached to the bottom of the separator. The regeneration gases are then passed via outlet line 34 through a pressure reducing or release valve 35 and thence to a waste gas stack or to suitable scrubbing and storage means if it is desired to utilize this gas as stripping gas in the system. In view of the fact that the oxidative reactions that occur in the regenerator generate more heat than can normally be transferred to the reactor by the circulating catalyst at low catalyst to oil ratios without exceeding safe temperature limits, it is ordinarily necessary to provide cooling coils in the regenerator. A very desirable arrangement is to provide cooling coils partly below and partly above the dense bed level L' to permit adjustment of the heat transfer capacity by simply varying the dense bed level L' in the regenerator vessel.

Regenerated catalyst is discharged from the dense bed 31 into a withdrawal well 36 through a submerged orifice or restricted passageway 37. The regenerated catalyst is discharged from the withdrawal well 36 through standpipe 38 and slide valve 39 into transfer line 40. A carrying gas is supplied through inlet line 41 to convey the regenerated catalyst through transfer line 40 into reactor vessel 10 via riser or inlet line 12. The carrier gas is, preferably, hydrogen-rich gas such as recycle process gas. In view of the fact that the hydrogen in the carrier gas reacts rapidly with the catalytic metal oxide at the temperature and pressure conditions obtaining in transfer line 40, it is desirable to make the latter of small diameter and as short as possible in order to keep the time of contact of the freshly regenerated catalyst and hydrogen sufficiently short to avoid overtreatment and/or thermal degradation of the catalyst from occurring. Ordinarily this time of contact should be less than 15 seconds and preferably is only about 3–5 seconds. Time of contact of freshly regenerated catalyst and hydrogen-rich gas can be increased considerably if temperatures in transfer line 40 can be controlled as by supplying a stream of recycle reactor catalyst thereto. While fresh naphtha feed can be introduced through line 12, it is ordinarily preferred to introduce the feed directly into reactor vessel 10 separately as through a distributor ring above grid 11.

Air for regeneration is supplied to compressor 27 and is passed therefrom through flow controller 28 to lines 24 and 25. The split of flow of air through lines 24 and 25 is regulated by flow control valve 29 and is predetermined so that a temperature approaching the regenerator temperature is obtained at TCP, the temperature control point, in the riser line from combustion of carbon. The temperature at TCP is used to actuate a control mechanism connected to slide valve 23 which decreases or increases the flow of catalyst in the riser in response to the temperature. For example, if it is desired to maintain a catalyst circulation rate corresponding to one catalyst/oil ratio, the temperature at TCP would be specified at a nominal value of say 1150° F. The amount of air supplied to riser 22 is fixed by flow control as previously mentioned to give the desired 1150° F. temperature at TCP when circulating at one catalyst/oil. In initial plant operation the calculated setting of the air rate can be checked by making a heat balance on the unit or preferably, by running a "diversion test" in which the flow of catalyst from regenerator 30 is stopped by closing valve 39 and the actual circulation rate is determined by measuring the increase in catalyst inventory in regenerator vessel 30 over a chosen time interval. Having made sure that the air rate to riser 22 is correctly adjusted to give the 1150° F. temperature at one catalyst/oil ratio, the TCP can be used to accurately control catalyst rate. If it is assumed that the circulation rate momentarily increases to 1.25 catalyst/oil ratio, the temperature at TCP would drop about 50° F. to 1100° F. If the catalyst rate decreased to say 0.75 catalyst/oil, the temperature would rise about 90° F. to 1240° F. It can be seen that this high degree of temperature sensitivity is admirably suitable for controlling catalyst rate since the temperature controller can easily correct the circulation by actuating slide valve 39 before the catalyst rate has a chance to change appreciably. The total air supply to regenerator 30 is advantageously controlled in plant operation by maintaining a slight amount of oxygen (about 1 to 5 mol percent $O_2$) in the vent gas from regenerator 30.

It is not intended that the invention be limited to the particular embodiment shown in the drawings. For example, U-bend transfer systems could be used for transferring stripped spent catalyst to the regenerator vessel 30 and for conveying regenerated catalyst to the reactor. Moreover, if because of catalyst loading considerations the air supplied to transfer line 22 is inadequate to convey the spent catalyst to the regenerator, a fixed quantity of inert gas can be introduced with the air to serve as carrying gas.

The feed or charging stock to the reforming reactor may be a virgin naphtha, a cracked naphtha, a Fischer-Tropsch naphtha or the like having a boiling range of from about 130°–430° F. or a narrow boiling fraction within this range, for example a fraction having a boiling range of from 130°–185° F. The feed stock is preheated alone or in admixture with hydrogen-rich recycle gas to reaction temperature or to the maximum temperature possible while avoiding thermal degradation of the feed stock. Ordinarily, preheating of the feed stock is carried out to temperatures of about 800°–1050° F., preferably about 1000° F. The naphtha preheat can be carried out to high temperatures by limiting the time of residence thereof in the preheat furnace and in the transfer or feed inlet lines. The preheated feed stock may be supplied to the reactor vessel for admixture with preheated hydrogen-rich recycle gas in the inlet line or below the distributor grid or it may be introduced separately through a distributor ring, or the like, arranged above the grid. The recycle gas, which contains from about 50–80 vol. per cent hydrogen is preheated to temperatures of about 1150°–1300° F., preferably about 1200° F. prior to the introduction thereof into the inlet line. The recycle gas should be circulated through the reforming reaction zone at a rate of from about 1000–8000 cu. ft. per barrel of feed. The amount of recycle gas used is preferably the minimum amount that will suffice to introduce the necessary heat of reaction and keep carbon formation at a low level.

The reactor system is charged with a mass of finely divided reforming catalyst particles. Suitable catalysts include group VI metal oxides such as molybdenum oxide, chromium oxide or tungsten oxide, or mixtures thereof, upon a carrier such as activated alumina, zinc aluminate spinel or the like. Preferred catalysts contain about 5 to 15 wt. percent molybdenum oxide or from about 10 to 40 wt. percent chromium oxide upon a suitable carrier. If desired, minor amounts of stabilizers and promoters such as silica, calcium oxide, ceria or potassia can be included in the catalyst. The catalyst particles are, for the most part, between 200 and 400 mesh in size or about 0–200 microns in diameter with a major proportion between 20 and 80 microns.

The reforming reactor vessel should be operated at temperatures between about 800° F. and 1150° F. and at pressures between about 5 and about 500 lbs. per sq. inch. The particular temperature and pressure used is governed principally by the nature of the feed stock and the nature of the end product desired. For example, a narrow boiling hexane rich fraction is preferably reformed in contact with a chromia-alumina catalyst at temperatures of about 1000°–1025° F. and at pressures of about 10 to 50 lbs. per sq. inch gauge while a 200°–350° F. boiling range naphtha is preferably reformed in contact with a molybdenum oxide-alumina catalyst at temperatures of about 900°–925° F. and at pressures of about 200 lbs. per sq. inch gauge. Lowering reactor pressure ordinarily results in increased carbon formation while increasing reactor pressures results in an increase in catalyst selectivity to light products ($C_4$'s and lighter). The regenerator vessel is normally operated at essentially the same pressure as the reactor vessel to facilitate flow between the several vessels and at temperatures of about 1050°–1200° F. The residence time of the catalyst in the reactor is of the order of from about 0.5 to 5.0 hours and in the regenerator of from about 3 to 15 minutes. Regeneration is ordinarily conducted with an excess amount of air or with such amounts of air that there will be some free oxygen in the flue gases from the regenerator and the catalytic metal will be converted to a higher oxide during regeneration.

The weight ratio of catalyst to oil introduced into the reactor should be about 0.5 to 1.5. Space velocity or the weight in pounds of feed charged per pound of catalyst in the reactor depends upon the age or activity level of the catalyst, the character of the feed stock and the desired octane number of the product. Space velocity for a molybdenum oxide on alumina gel or a chromia-alumina catalyst may vary, for example, from about 1.5 wt./hr./wt. to about 0.15 wt./hr./wt.

The temperature in the regenerator is maintained at between about 1050° and about 1200° F., preferably at the maximum temperature that the catalyst can withstand in order that a maximum amount of heat can be transferred to the reaction zone as sensible heat of the regenerated catalyst.

The foregoing description contains a limited number of embodiments of the present invention. It will be understood, however, that numerous variations are possible without departing from the scope of this invention.

What is claimed is:

In a process for reforming hydrocarbons in contact with finely divided reforming catalysts in accordance with the fluidized solids technique wherein hydrocarbons and catalyst are continuously supplied to a reaction zone, reaction products and catalyst are continuously withdrawn from the reaction zone, the catalyst particles are regenerated in a separate regeneration zone, and recycled to the reaction zone, the improvement which comprises supplying catalyst and hydrocarbon feed to the reaction zone at a rate to establish a catalyst-to-oil ratio of between 0.5 and 1.5, discharging a stream of spent catalyst from the reaction zone into a transfer line for conveyance to the regeneration zone, adjusting the flow of air to the spent catalyst transfer line to raise the temperature of the spent catalyst at a point just prior to discharge into the regenerator, to substantially the same temperature as in the regenerator while burning a substantial portion but not all of the carbonaceous deposits from the catalyst in the transfer line, supplying the remainder of the air necessary for regeneration directly to the regeneration zone, thereafter maintaining a substantially constant rate of flow of air to said transfer line and directly to the regenerator and maintaining the temperature of the catalyst at said point substantially constant by increasing the flow of spent catalyst into the transfer line as the temperature increases and decreasing the flow of spent catalyst into the transfer line as the temperature of the catalyst decreases at said point.

References Cited in the file of this patent

UNITED STATES PATENTS

| | | |
|---|---|---|
| 2,414,002 | Thomas et al. | Jan. 7, 1947 |
| 2,438,728 | Tyson | Mar. 30, 1948 |
| 2,446,247 | Scheineman | Aug. 3, 1948 |
| 2,488,406 | Hirsch | Nov. 15, 1949 |
| 2,662,050 | Moorman et al. | Dec. 8, 1953 |
| 2,694,672 | MacLaren | Nov. 16, 1954 |